US012559664B2

(12) United States Patent
Prabhu et al.

(10) Patent No.: US 12,559,664 B2
(45) Date of Patent: Feb. 24, 2026

(54) CHEMICAL COMPOSITIONS FOR GEOTHERMAL WELL STIMULATION

(71) Applicant: Schlumberger Technology Corporation, Sugar Land, TX (US)

(72) Inventors: Rasika Prabhu, Houston, TX (US); Jushik Yun, Sugar Land, TX (US); Konstantin Viktorovich Vidma, Sugar Land, TX (US); Patrice Abivin, Houston, TX (US); Haiyan Zhao, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/737,332

(22) Filed: Jun. 7, 2024

(65) Prior Publication Data

US 2024/0409803 A1 Dec. 12, 2024

Related U.S. Application Data

(60) Provisional application No. 63/506,694, filed on Jun. 7, 2023.

(51) Int. Cl.
*E21B 43/26* (2006.01)
*C09K 8/508* (2006.01)
(Continued)

(52) U.S. Cl.
CPC .............. *C09K 8/5086* (2013.01); *C09K 8/68* (2013.01); *E21B 33/138* (2013.01);
(Continued)

(58) Field of Classification Search
None
See application file for complete search history.

(56) References Cited

U.S. PATENT DOCUMENTS 4,834,181 A * 5/1989 Uhri ....................... E21B 43/26
166/308.1
8,905,133 B2 12/2014 Potapenko
(Continued)

FOREIGN PATENT DOCUMENTS

WO 2019221693 A1 11/2019

OTHER PUBLICATIONS

Search Report and Written Opinion of International Patent Application No. PCT/US2024/032960 dated Sep. 26, 2024, 13 pages.

*Primary Examiner* — Andrew Sue-Ako
(74) *Attorney, Agent, or Firm* — Kyle R. Miiller

(57) ABSTRACT

A method, apparatus, system, and compositions for introducing diversion agents into a subterranean formation traversed by a wellbore with a heat transfer surface, including forming a first fluid comprising a diversion agent, introducing the first fluid into a region of the formation wherein the heat transfer surface is higher than if no agent were present, and introducing a second fluid for collecting heat from the formation. A method, apparatus, system, and compositions for introducing diversion agents into a subterranean formation traversed by a wellbore with a heat transfer surface, including forming a first fluid comprising a diversion agent, introducing the first fluid into a region of the formation wherein the formation is at least 350° F. and wherein the agent maintains its mechanical integrity at least 2 hours, and introducing a second fluid to the formation.

20 Claims, 4 Drawing Sheets

(51) Int. Cl.
      *C09K 8/68*          (2006.01)
      *E21B 33/138*        (2006.01)
      *F24T 10/20*         (2018.01)

(52) U.S. Cl.
      CPC ............ *E21B 43/261* (2013.01); *F24T 10/20*
                      (2018.05); *C09K 2208/08* (2013.01)

(56)                   References Cited

U.S. PATENT DOCUMENTS

| | | | | |
|---|---|---|---|---|
| 9,090,810 | B2 | 7/2015 | Bour | |
| 9,151,125 | B2 | 10/2015 | Watters | |
| 9,212,535 | B2 | 12/2015 | Tippel | |
| 9,322,260 | B2 | 4/2016 | Potapenko | |
| 2008/0093073 | A1* | 4/2008 | Bustos | C09K 8/88 |
| | | | | 507/221 |
| 2008/0210423 | A1* | 9/2008 | Boney | C09K 8/685 |
| | | | | 166/281 |
| 2008/0289823 | A1 | 11/2008 | Willberg | |
| 2010/0044039 | A1 | 2/2010 | Rose | |
| 2012/0181034 | A1* | 7/2012 | Bour | C09K 8/508 |
| | | | | 166/310 |
| 2018/0347332 | A1 | 12/2018 | Bestaoui-Spurr | |
| 2021/0187604 | A1* | 6/2021 | Sherman | C22C 47/08 |

\* cited by examiner

FIG. 2

Molecular Structure of Polyethylene Terephthalate
PET Chemical Formula: $(C_{10}H_8O_4)_n$

CHEMICAL COMPOSITIONS FOR GEOTHERMAL WELL STIMULATION

CROSS-REFERENCES TO RELATED APPLICATIONS

This application claims the benefit of and priority to U.S. Provisional Patent App. No. 63/506,694, filed Jun. 7, 2023 with the same title. This application is incorporated herein by reference in its entirety.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Stimulation operations when forming or optimizing a geothermal well are performed to increase the contact of fluid, such as water, with the rock. The rock face heat transfer surface area matters—more surface area facilitates more heat transfer across the rock face. These operations may include fracturing and acidizing.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments herein relate to a system, apparatus, composition, and method for introducing diversion agents into a subterranean formation traversed by a wellbore with a heat transfer surface area, including forming a first fluid comprising a diversion agent, introducing the first fluid into a region of the formation wherein the heat transfer surface area is higher than if no diversion agent were present, and introducing a second fluid for collecting heat from the formation. In some embodiments, the formation is 350° F. or hotter. The diversion agent may include polyurethane, polyethylene terephthalate, polyamide, nylon, polyamide-imide, polycaprolactone, dissolvable elastomer, polysaccharide materials, or combinations thereof. In some embodiments, the diversion agent is a polymer blend comprising polyethylene terephthalate and polycaprolactone, polyethylene terephthalate and polybutylene terephthalate, polyethylene terephthalate and nylon, nylon and polyamide-imide, or a combination thereof. The diversion agent may be present in the first fluid at a concentration between 30 and 60 weight percent. The diversion agent may be present in the first fluid at a concentration between 10 and 90 weight percent. Further, the diversion agent may include an additive. The additive may be present in the diversion agent at a concentration between 10 and 50 weight percent. The additive may include carbon, glass, aramid, natural fiber, synthetic fiber, or a combination thereof. In some embodiments, the diversion agent includes an additive present in the diversion agent at a concentration between 1 and 20 weight percent which may contain PTFE, graphite, Ceramer™, or a combination thereof. In some embodiments, the diversion agent maintains its mechanical integrity for at least two hours. Hydraulic fracturing, fluid stimulation, or a combination thereof may be performed during the at least two hours.

Certain embodiments herein relate to a system, apparatus, composition, and method for introducing diversion agents into a subterranean formation traversed by a wellbore with a heat transfer surface, including forming a first fluid comprising a diversion agent, introducing the first fluid into a region of the formation wherein the formation is at least 350° F. and wherein the diversion agent maintains its mechanical integrity for at least two hours, and introducing a second fluid to the formation. The diversion agent may include polyurethane, polyethylene terephthalate, polyamide, nylon, polyamide-imide, polycaprolactone, dissolvable elastomer, polysaccharide materials, or combinations thereof. The diversion agent may include a polymer blend comprising polyethylene terephthalate and polycaprolactone, polyethylene terephthalate and polybutylene terephthalate, polyethylene terephthalate and nylon, nylon and polyamide-imide, or a combination thereof. The diversion agent may be present in the first fluid at a concentration between 10 and 90 weight percent. The diversion agent may include an additive present in the diversion agent at a concentration between 10 and 50 weight percent. The diversion agent may include carbon, glass, aramid, natural fiber, synthetic fiber or a combination thereof.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIG. 2 is a chemical structure of polyether polyurethane.

FIG. 3 is a chemical structure of polyethylene terephthalate (PET).

FIG. 4 is a chemical structure of polyamide.

DETAILED DESCRIPTION

Figure 1B:
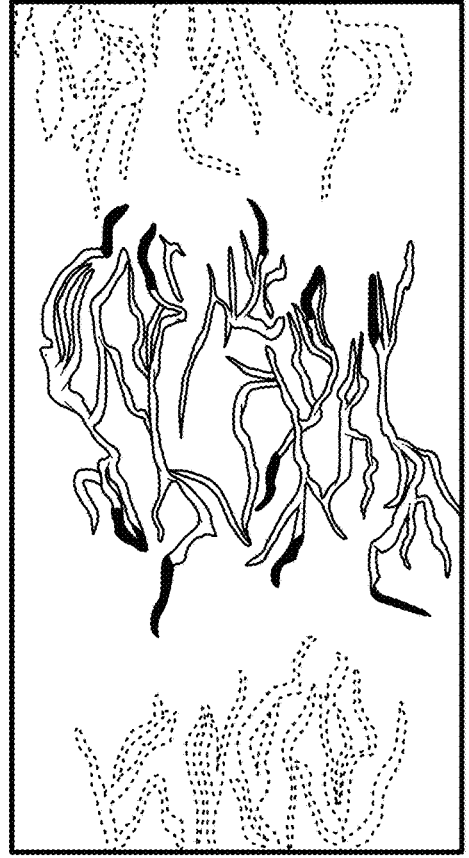
FIG. 1B is a sectional view of diverters in fractures in rock.
Figure 1A:
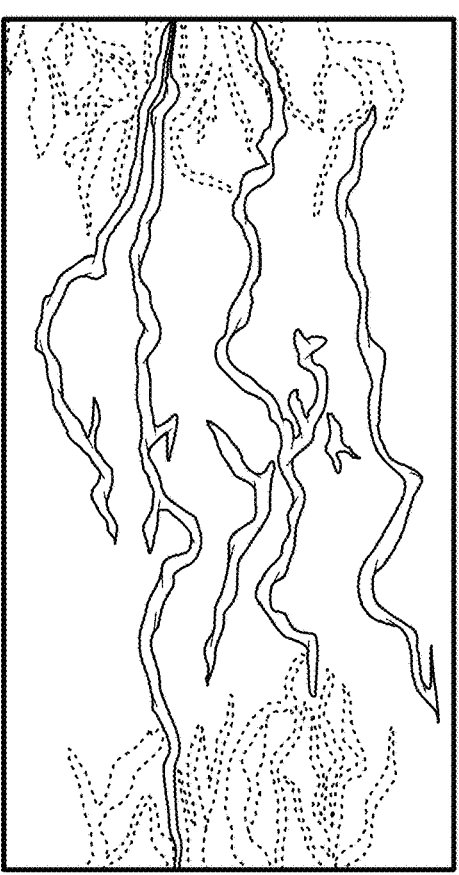
FIG. 1A is a sectional view of fractures in rock.

Embodiments herein relate to oil, gas, and geothermal wells with bottomhole temperatures above 350° F. In multiple-stage fracturing and acidizing operations, diversion techniques may be required. Further, when a heat recovery operation does not collect as much heat as expected, it may imply that the flow patterns through a formation have lost tortuosity. Diversion is tailored to change the rock surface area to slow or inhibit fluid flow generally, to change the fluid flow properties at the rock surface, to change the fluid flow in the regions near the rock surface, to agglomerate solids and viscous materials in along the rock surface and regions near the rock surface to retard fluid flow, or to provide a combination of fluid blocking, slowing, hampering, and diverting. At the end of each fracturing or acidizing or flush stage, a diversion agent (also referred to herein as a diverter) may be injected following the fracturing or acidizing fluid with the goal that the next stage of fracturing or acidizing fluid will be diverted to a new zone. Also, in some embodiments, during a fracturing or acidizing treatment, a diversion pill may be added to the fluid to temporarily block the flow path and divert the subsequent fluid into new zones or natural fractures. In some reservoirs where natural fractures or fissures exist, fluid loss may also be an issue, therefore, fluid loss additives may be required in fracturing or acidizing fluids. FIGS. 1A and 1B illustrate some aspects.

FIGS. 1A and 1B are a series of schematics of a rock fracture network. Newly created hydraulic fractures are shown in bold, continuous, solid lines, and existing fractures are shown in dashed lines. FIG. 1A is a sectional view of new fractures created using conventional hydraulic fracture technology. Limited reservoir-fluid contact surface area is created, and injected fluids short-circuit through the reservoir. FIG. 1B is a sectional view of the use of diverters in solid bold for creation of new hydraulic fractures. That is, diversion agents placed at the fracture regions farthest from the wellbore are used to restrict fracture length, and the fracturing energy is used to create more new fractures in the formation with more complex, branched, or outspread fracture incursion into the rock, thereby avoiding the creation of fractures a longer distance from the wellbore and avoiding fluid communication with existing formation fractures across the expansive bulk of the formation. In some embodiments, near-wellbore diverter could also be used. Thus, tailoring the placement, composition, material science, and particle geometry of the diversion agents creates complex fracture networks in the formation closest to the wellbore and maximizes the reservoir contact closest to the wellbore with the injected fluids, promoting controlled heat (for geothermal) and mass (for oil and gas) transfer between the injected fluids and the reservoir.

Solids (in particle and/or fiber form), highly viscous fluids, other materials, and combinations thereof are used as diverters and fluid loss additives in well stimulations for temporary or permanent applications over time. Some are selected to be intentionally degradable over time, upon exposure to other chemicals, or upon exposure to high temperature conditions. The placement of these materials often increase the stimulation efficiency by helping tailor hydraulic power delivery to the formation rock face. The degradable materials may perform as designed during operations and later degrade completely without causing any lasting formation damage.

Because geothermal wells are drilled to bring hot water or steam, or both, to the surface for different applications including electricity generation and heating and cooling, selecting effective diverting workflows and compositions requires effective planning. For example, the temperature required for electrical power generation is generally greater than 175° C. Therefore, degradable materials that are effective for high temperature operations will be useful in the stimulation operations of hot geothermal wells. Materials that work as diverters, lost circulation materials (LCM), and fluid loss additives at a temperature range of 350° F. to 500° F. bring value to geothermal operations. In some embodiments, it is important to select polymer materials that are stable for at least 10 hours with mechanical stability under 350° F. to 500° F. during hydraulic fracturing and fluid stimulation. After that, materials can be degraded with heat and downhole fluids. Some methods may further include multistage stimulation subsequently.

Several materials may be effective over the temperature range and chemical properties required. Herein, we will discuss polyether polyurethane, polyethylene terephthalate (PET), polyamide, nylon, polyamide-imide, polycaprolactone, dissolvable elastomer, polysaccharides, and combinations thereof. Some embodiments may benefit from combination with fillers and additives for modification such as carbon, glass, aramid, or any other suitable natural or synthetic fiber. Other reinforcing additives such as micron sized PTFE, graphite, or Ceramer™ may be appropriate for some embodiments.

Some embodiments may select diversion agents that degrade. The diversion agents may be tailored for a specific geometric profile. The diverting materials may be pumped simultaneously and uniformly in some embodiments. In embodiments where a first bridging material and a second bridging material are introduced simultaneously into a fracture, they may intermingle with the formation of a bridge. In such embodiments, a first bridging agent and fibrous material or other complex materials such as precipitates, etc. suspended in a carrier fluid are pumped into a far field region, being placed near the outer border (perimeter) of the growing fracture. The bridging particles and the fibers intermingle to form a plug. The bridging particles may have a size big enough to bridge next to the fracture tip. In one or more embodiments, the bridging particles may have a multimodal physical dimension distribution.

In some embodiments, fibers degrade in a way that may be tailored based on the rock heat transfer properties, such as rock temperature, rock thermal conductivity and fracture network geometry that defines the configuration of a heat sweep. In some embodiments, the subterranean formation comprises sedimentary, igneous, metamorphic rock or a combination thereof. Bridging particle size and concentration may be chosen based on the fracture geometry (mostly fracture width). In some embodiments, bridging particle size must be larger than a fracture half-width at a concentration above 1 pound per gallon of fluid added.

Degradable material is effective in some embodiments because once the reservoir reheats, one may want to resume injection in that flow path. Some embodiments may optimize the timing of degradation to match the reheating time for the reservoir. This would simplify surface operation as one would inject water continuously and periodically inject degradable diverters on a set schedule. The degradation timing will be engineered to ensure the fluids flow to the right part of the reservoir every time.

Any degradable or dissolvable material (bridging particles or fibers or both) must degrade slowly enough to provide sufficient bridging during its placement. Time scale for placement, for heating to specific temperature might be obtained based on a fracturing simulation as well as based on the real-time temperature measurements performed by bottomhole gauges or by monitoring of the water heat content in a producer well. Some embodiments may benefit from various modelling packages that exist to model heat transfer and temperature evolution in the reservoir as well as inside the fracture network generally.

After a bridge of particulates and fibers has been formed, it may undergo complex evolution in terms of degradation. Degradation typically is a strong function of temperature inside the fracture. Temperature inside the fracture is defined by an equilibrium between the heat inflow (from the geothermal heat of reservoir) and heat outflow (carried by circulating water). In some embodiments, the actual degradation of diversion material can be modelled in advance and can be used to design the treatment and to select bridging material or fiber or both. In some embodiments, a plug made of solid degradable particulates including fibers keeps mechanical strength and diverts efficiently until about 50 percent of the starting material by mass is degraded. Some embodiments may be informed by how the degradation or dissolution data for any degradable material used (be it bridging particles or fibers) can be experimentally obtained in the laboratory for the material used for diversion.

Geometry may play a role in tailoring transport, bridging, and diverting for some materials. A bridging material may be tailored for the fracture or fractures at hand—large, medium, or small particles may be appropriate for some embodiments. The size of the bridging material may be 100 mesh or 40/70, or 30/50 or 20/40 or 16/30 or 16/20. Fibers may be added and may be introduced in an amount of 5-100 percent by weight less than the amount of proppant. Fiber chemical identity as well as shape, size, and concentration can be tailored based on the temperature profile. Fiber length can be in the range from 0.1 mm to 50 mm, with the aspect ratio (length to width) in the range from 2 to 10,000. The concentration of the fibers pumped in a stage of an operation may be varied within the limits of 0.1-1000 ppt. Further, the fiber material may be any polymeric fiber, such as cellulose fibers. The amount of the fibers pumped during a stage may be varied within the range of 10-30 000 lb. The first and the second stage of the fracturing operation may be pumped sequentially, one after another, or may be spaced with clean fluid or with a particle laden stage. A stage may be pumped at the beginning of the cycle, during the cycle or after the cycle.

Next, a discussion of materials appropriate for the embodiments discussed herein is provided. These materials have been selected for their resistance to degradation at high temperatures, which make them suitable for geothermal and ultra-high temperature fracturing applications.

HT Polyether PU Material

Figures 2, 3, 4:
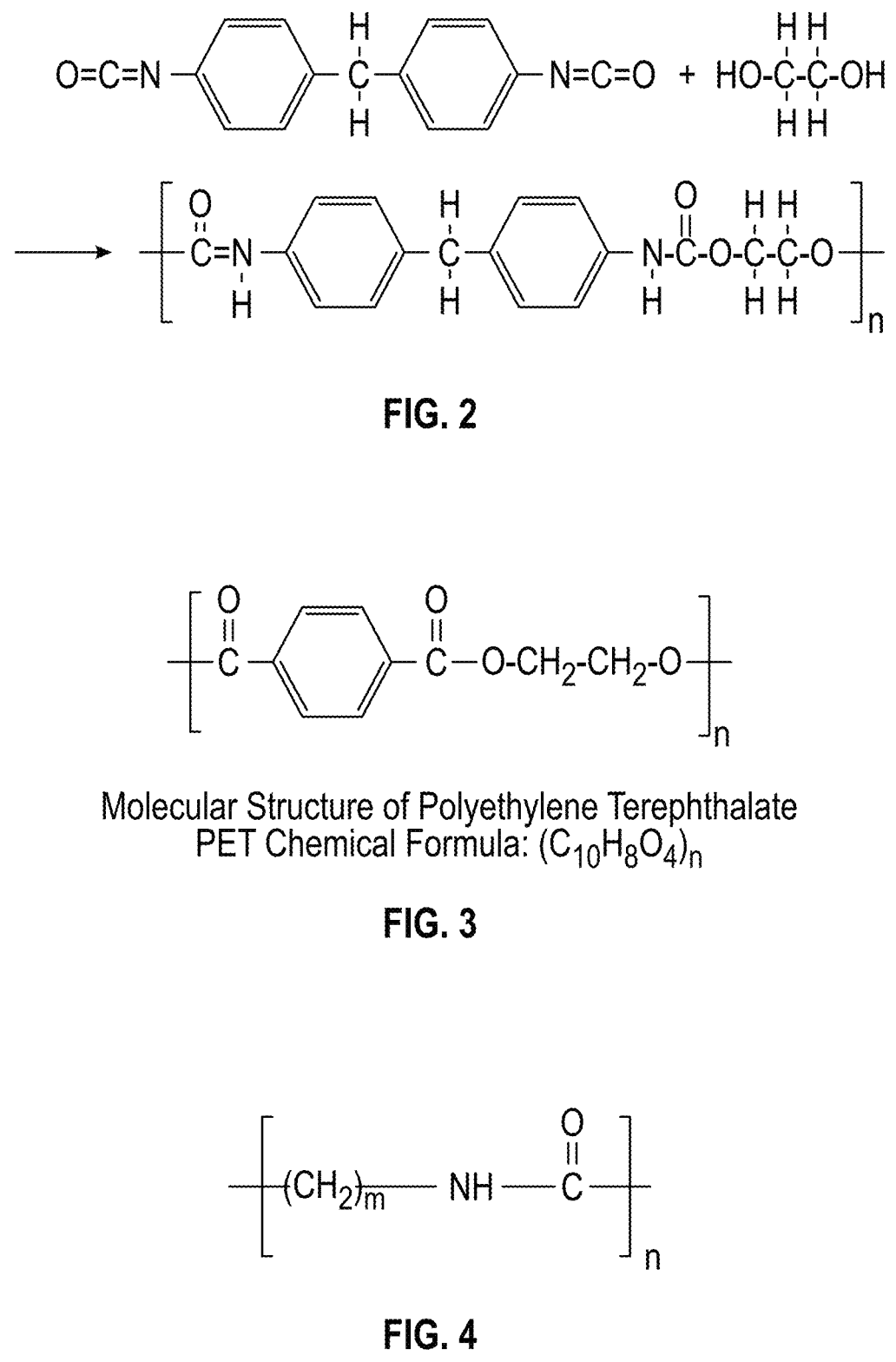

FIG. 2 provides the chemical structure of polyether polyurethane. Resin based materials such as polyurethanes (PUs) may degrade depending on composition and additives. For example, such materials sometimes crumble due to hydrolysis. Lab testing of two Adiprene products available commercially from LanXess of Pittsburg, PA shows progressive degradation by hydrolysis of polyurethane material for one material and stability over two days at 200° F. for another material. Two main general factors that determine thermal resistance of PUs are its structure and the presence of additives. The structural factors that influence thermal stability of PUs are the chemical nature and composition of hard (isocyanate plus chain extender) and soft (macrodiol) segments, the segregation of PUs, and PU thermoplasticity (derived from characteristic of TPU's stable linear structure). The additives that may be selected for augmenting thermal stability of PUs are mineral fillers (e.g., nano-oxides, nanoclays, talcs) and specific modifiers like POSS, flame retardants (both as additive and as polyol modifier), and fibers (natural or synthetic). Also, blending and grafting with other polymers are strategies that are utilized for increasing thermal resistance of PU, both for improving processing in manufacture and for high demanding applications. PU can be modified with mineral fillers to increase thermal stability up to 400° F.

Polyethylene Terephthalate (PET) and PET Thermally/Mechanically Reinforced Materials FIG. 3 provides the chemical structure of polyethylene terephthalate (PET). Embodiments herein may use a diversion agent such as a polymer blend including a mixture of PET and polycarbonate (PC) (30~60 weight percent), PET and polybutylene terephthalate (PBT) (30~60 weight percent), PET/Nylon (10~90 weight percent), and Nylon and polyamide-imides (PAI), or a combination thereof. PET/PC may be present in 30 to 60 weight percent, PET/PBT may be present in 30 to 60 weight percent, PET/nylon may be present in 10 to 90 weight percent.

Polyethylene terephthalate (PET) is an aliphatic polyester. It has a semi-crystalline form when stable. PET has a glass transition temperature of 65-80° C., depending on degree of crystallinity, and a melting temperature of 240-270° C. A fully amorphous PET has a Tg of 65° C. and Tg increases with increasing degree of crystallinity. PET crystallizes in the temperature range of 10° C. above its glass transition temperature up to 10° C. below its melting temperature, with maximum crystallization rate at 178° C. PET normally reaches a crystallinity of 40-50 percent, but can also be polymerized to a co-polymer that cannot crystallize.

PET in amorphous form is easily affected by boiling water, alkalis, and strong bases. Also, it can easily be attacked at high temperatures (>60° C.) by ketones, aromatic and chlorinated hydrocarbons, and diluted acids and bases.

In order to make PET capable of handling aggressive chemical environments as well as withstand elevated temperature, PET may be molded with crystalline PET polyester. Additionally, the crystalline form of PET sometimes requires additives such as nucleating agents, as well as the solid particles of fillers and reinforcements, to make this polyester capable of applications beyond packaging. For example, PET modified with polyolefins are often glass fiber reinforced and used in injection molded automotive and industrial applications. PET/PC (30~60 weight percent) or optionally PBT (30~60 weight percent) blends applications include those requiring a combination of excellent toughness, chemical and heat resistance along with high impact, tensile and flexural strength PC or PBT blend to provide better mechanical properties and heat/chemical resistance and it can control the degree of degradation at a given temperature by blending ratio. Higher PC and PBT ratio will slow down degradation.

Blending thermosets with PET significantly improves thermal, mechanical, impact resistance, and flame retardant properties. PET compounds can hold 400° F. to 500° F. short thermal stability. Glass reinforcement may also be effective for tuning PET containing compound properties.

TABLE 1

Typical mechanical properties of PET glass fiber reinforced (30 weight percent) compounds.

| Properties | ASTM | Value |
|---|---|---|
| Glass reinforced content | | 30 percent |
| Tensile strength | D638 | 152 MPa |
| Tensile Elongation | D638 | 5 percent |
| Flexural strength | D790 | 221 MPa |
| Flexural modulus | D790 | 9653 MPa |
| Heat Deflection Temperature (HDT) (1820 kPa) | D648 | 224° C. |

Polyamide, Polyamide—Glass Reinforced Materials

FIG. 4 provides a chemical structure of polyamide. Polyamides may include Nylon 6, Nylon 66, Nylon 6/66, Nylon 6/12, Nylon 6/10, Nylon 11, or Nylon 12, or combinations thereof.

Polyamides are susceptible to hydrolysis at high temperatures, which is facilitated further by an acidic environment. Polyamides can be degradable in water at elevated temperature. If one need to have much faster degradation at given temperature, acid will facilitate the degradation.

Trade names of commercially available versions of these polyamide materials include:

Orgalloy®, RILSAN® or RILSAN® from Arkema

BASF Ultramid®, Miramid® from BASF

Zytel® DuPont Engineering Polymers

Figure 5:
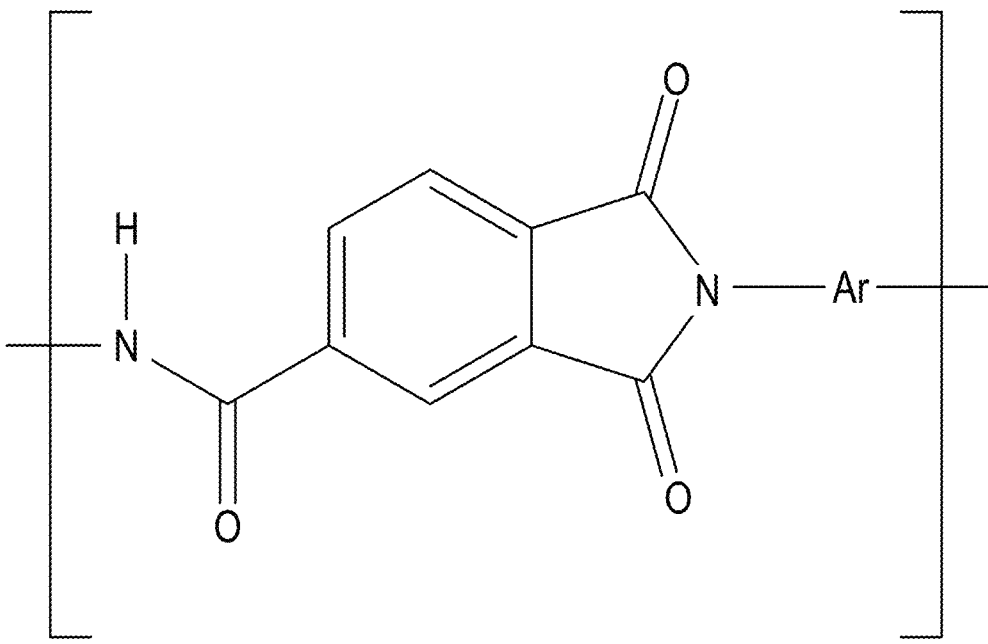
FIG. 5 is a chemical structure of polyamide-imide.

Polycaprolactam, polyamide 6, PA6, poly-ε-caproamide, Perlon, Dederon, Capron, Ultramid, Akulon, Nylatron, Kapron, Alphalon, Tarnamid, Akromid, Frianyl, Schulamid, Durethan, Technyl, Nyorbits, Winmark Polymers PAI (Polyamide-Imide) and Their Reinforced Compounds FIG. 5 is a chemical structure of polyamide-imide. TORLON® PAI is virtually unaffected by aliphatic and aromatic hydrocarbons, chlorinated and fluorinated hydrocarbons, and most acids at moderate temperatures. The polymer, however, may be attacked by saturated steam, strong bases, and some high-temperature acid systems. PAI is chemically resistance polymer from hydrocarbon oil. But it is degradable in saturated steam, strong base as well as high temperature acid. PAI is high temperature rating polymer but it can be degradable by steam, base and acid similar to Nylon above.

Polycaprolactone

Figure 6:
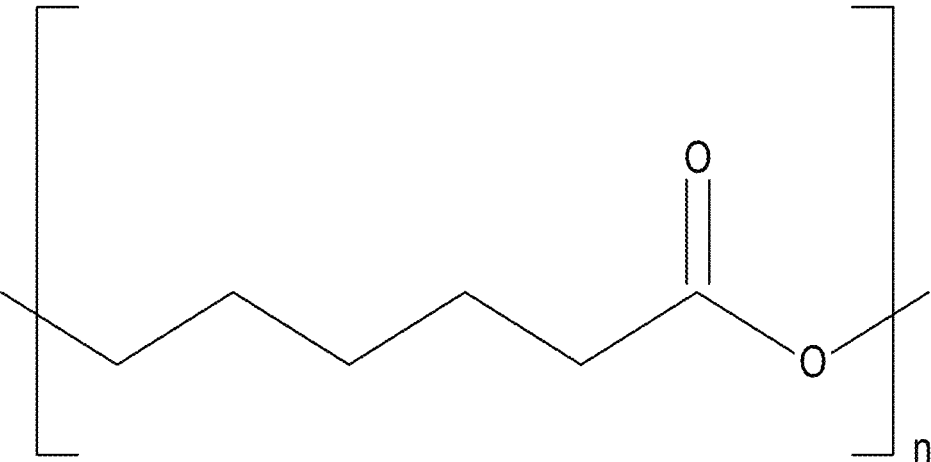
FIG. 6 is a chemical structure of polycaprolactone.
Figure 7A:
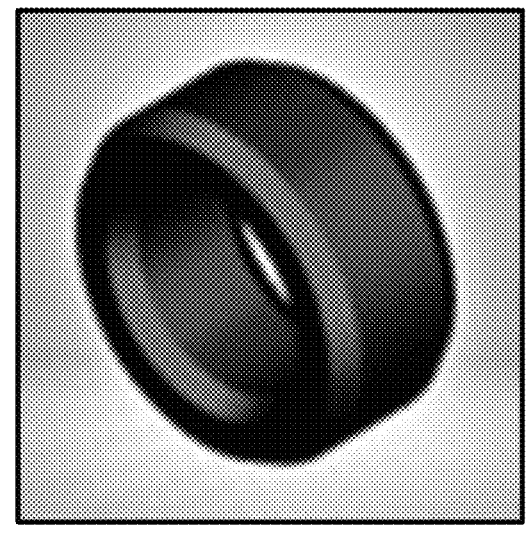
FIGS. 7A, 7B, 7C, and 7D are a series of dissolvable elastomer in the midst of undergoing dissolution.
Figure 7B:
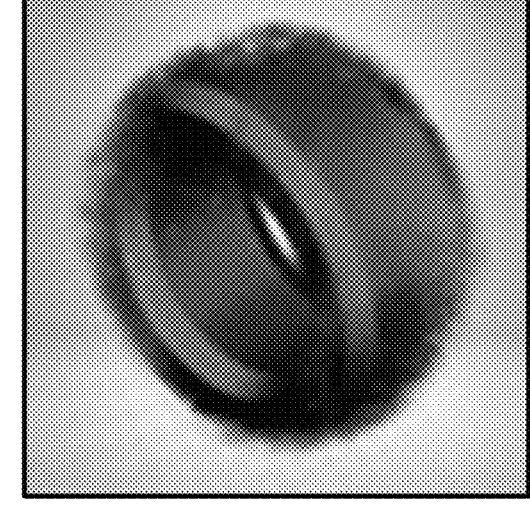
Figure 7C:
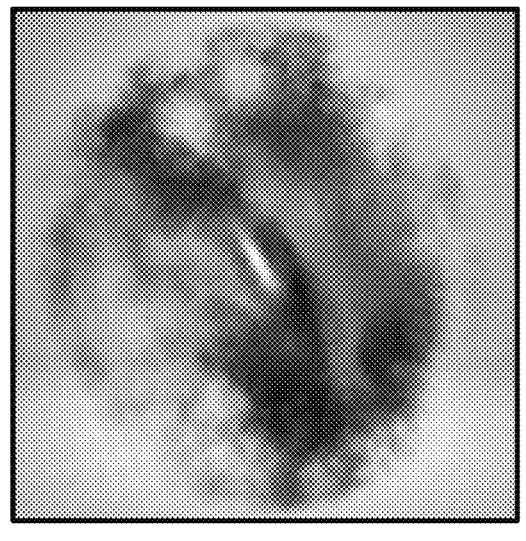
Figure 7D:
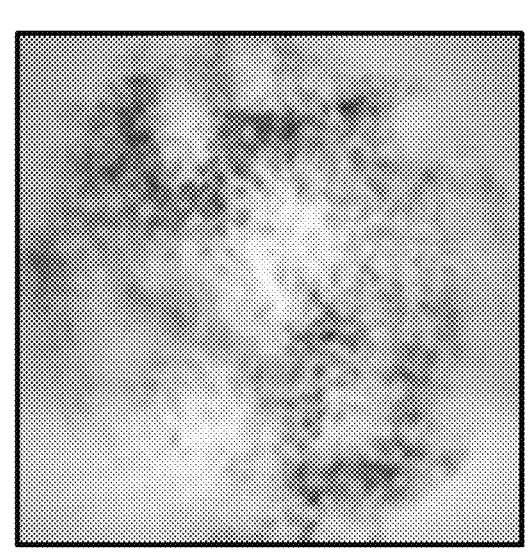

FIG. 6 is a chemical structure of polycaprolactone. Polycaprolactone belongs to the class of polyesters. It degrades slower than PLA (polylactic acid). It is possible to form different copolymers and composites of polycaprolactone to tailor the properties depending on the application conditions. Polycaprolactone is polyester type polymer and it is degradable by hydrolysis similar to PET above.

Dissolvable Elastomer

FIGS. 7A, 7B, 7C, and 7D are a series of dissolvable elastomer in the midst of undergoing dissolution. There are a few commercially available dissolvable elastomers such as Elementum from Terves which are used for preparing downhole tool components. These are moldable into different shapes and undergo weight loss over days when exposed to water and brine at high temperatures.

Other examples of trade names under which dissolvable elastomers are commercially available are listed below:

DEP IMpact™ (BUBBLEtight);

Kureha Degradable rubber KDR01H (Kureha).

It is high molecular PGA type elastomer and it degrades in water without injection acid/alkali solution.

Polysaccharide Materials

Cellulose, Starch, crosslinked alginate and such other polysaccharides are degradable only at very high temperatures due to increased crystalline structure. Polysaccharides are polymeric carbohydrates composed of long chains of monosaccharide units by joined by glycosidic linkage. Polysaccharides can be made water soluble.

Filler & Additives for Polymer Modification

Another way to further improve the thermal resistance of polymeric materials is to reinforce the base polymer with filler materials. These fillers can be particulate or fiber form and embedded in the polymer matrix, such as carbon, glass, aramid or any other suitable natural or synthetic fiber, along with fibers in polymer matrix, and other reinforcing additives such as micron sized PTFE, Graphite, Ceramer™. Some embodiments may benefit from blends of polymers such as PET/PC, PET/Nylon, Nylon/PAI, and combinations thereof.

Degradation Testing

Some candidate materials were tested for degradation, that is, for maintaining the mechanical integrity to provide diversion, at high temperatures by a weight loss measurement. About 1-1.5 g of polymer was immersed in 10 ml water and heated at 200° C. under sufficient pressure. The weight loss of the polymer after the test was recorded. The diverter material should be able to resist degradation for 2-4 hours to be able to provide diversion. An existing SLB diverter material was selected for comparison with specific properties and it degrades rapidly and weight loss is 100% within 2.5 hours showing that this material is not sufficiently stable at such high application temperature. Weight loss of various new degradable materials was measured in the lab for comparative purposes. Some products were more successful at maintaining their integrity showing less than 10 percent weight loss within 2.5 hr at 200° C. These include DGS Divert HT154 and DGS Divert HT154 F015—These are copolyesters from Dynamic Green Solutions and showed relatively low weight loss percentages in lab testing.

PEBAX SS13 SA01 which is a polyether block amide (PEBA) from Arkema.

Other potential materials from the concepts discussed in this application and their properties are listed in the Table 2 below.

TABLE 2

High tensile strength is a desirable property, which is a potential indicator of diverter plug strength during the application. Filler additives such as glass fibers in RTP 1105 in the table above, show enhancement of tensile strength compared to non-reinforced materials. Filler additives can also help to reduce the rate of hydrolysis and improve the thermal resistance compared to unfilled base polymer.

| Material name | Melting point (C.) | Tensile strength (MPa) | Type |
|---|---|---|---|
| RISAN HT CMNO | 255 | 64 | Nylon/Polyamide, 65 percent biobased |
| RILSAN PA 11 BESNO TL | 186 | 38 | Nylon 11 (PA 11) 96 percent biobased |
| PEBAX SS13 SA01 | 195 | 60 | Polyether block amide (PEBA) |
| PUR LFPE560 | | 48 | Polyether PU |
| PUR LFP R375 | | 53 | Polycarbonate PU |
| RTP 1105 | 282.5 | 152 | Polyethylene Terephthalate (PET) Glass fiber 30 percent |

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

We claim:

1. A method, comprising:

performing a fracture treatment to form a fracture off a geothermal wellbore traversing a subterranean formation;

introducing a first fluid comprising a diversion agent into the fracture;

placing the diversion agent proximate a region of the fracture that is farthest from the geothermal wellbore, wherein a heat transfer surface area of the fracture is larger than if no diversion agent were present;

introducing a second fluid for collecting heat from the subterranean formation; and producing hot water, steam, or a combination thereof via heat transfer between the second fluid and the subterranean formation;

wherein the first fluid is introduced periodically on a predetermined schedule, and the second fluid is introduced continuously.

2. The method of claim 1, wherein a temperature of the formation is 350° F. or hotter.

3. The method of claim 1, wherein the diversion agent comprises polyethylene terephthalate.

4. The method of claim 3, wherein the diversion agent is a polymer blend and further comprises polycaprolactone.

5. The method of claim 3, wherein the diversion agent is a polymer blend and further comprises polybutylene terephthalate.

6. The method of claim 3, wherein the diversion agent is a polymer blend and further comprises nylon.

7. The method of claim 1, wherein the diversion agent is present in the first fluid at a concentration between 30 and 60 weight percent.

8. The method of claim 1, wherein the diversion agent is present in the first fluid at a concentration between 10 and 90 weight percent.

9. The method of claim 1, wherein the diversion agent comprises an additive, wherein the additive is present in the diversion agent at a concentration between 10 and 50 weight percent.

10. The method of claim 9, wherein the additive comprises glass.

11. The method of claim 1, wherein the diversion agent comprises an additive, wherein the additive is present in the diversion agent at a concentration between 1 and 20 weight percent.

12. The method of claim 11, wherein the additive comprises a reinforcing additive.

13. The method of claim 1, wherein the diversion agent maintains its mechanical integrity for at least two hours, and wherein, during the at least two hours, the method further comprises hydraulic fracturing, fluid stimulation, or a combination thereof.

14. The method of claim 1, wherein:

the diversion agent is a polymer blend comprising polyethylene terephthalate and one of:

polycaprolactone, wherein the diversion agent is present in the first fluid at a concentration between 30 and 60 weight percent when the polymer blend comprises polyethylene terephthalate and polycaprolactone;

polybutylene terephthalate, wherein the diversion agent is present in the first fluid at a concentration between 30 and 60 weight percent when the polymer blend comprises polyethylene terephthalate and polybutylene terephthalate; or nylon, wherein the diversion agent is present in the first fluid at a concentration between 10 and 90 weight percent when the polymer blend comprises polyethylene terephthalate and nylon;

the polyethylene terephthalate is reinforced with glass fiber present in the polyethylene terephthalate at a concentration of 30 weight percent;

the predetermined schedule is based on a degradation rate of the diversion agent and a reheating rate of the subterranean formation; and the degradation rate and the reheating rate are determined based on at least one of:

modeled heat transfer and temperature behavior in the geothermal wellbore and the fracture;

temperature measurements obtained from the geothermal wellbore via one or more downhole sensors; or monitored water heat content in the geothermal wellbore.

15. A method, comprising:

performing a fracture treatment to form a fracture off a geothermal wellbore traversing a subterranean formation;

introducing a first fluid comprising a diversion agent into the fracture, wherein a temperature of the subterranean formation is at least 350° F., and wherein the diversion agent maintains its mechanical integrity for at least two hours;

placing the diversion agent proximate a region of the fracture that is farthest from the geothermal wellbore;

introducing a second fluid to the subterranean formation; and producing hot water, steam, or a combination thereof via heat transfer between the second fluid and the subterranean formation;

wherein the first fluid is introduced periodically on a predetermined schedule, and the second fluid is introduced continuously.

16. The method of claim 15, wherein the diversion agent comprises polyethylene terephthalate.

17. The method of claim 15, wherein the diversion agent is present in the first fluid at a concentration between 10 and 90 weight percent.

18. The method of claim 15, wherein the diversion agent comprises an additive, wherein the additive is present in the diversion agent at a concentration between 10 and 50 weight percent.

19. The method of claim 18, wherein the additive comprises glass.

20. The method of claim 15, wherein the diversion agent comprises an additive, wherein the additive is present in the diversion agent at a concentration between 1 and 20 weight percent.

* * * * *